United States Patent
Bezrukov et al.

(10) Patent No.: US 7,380,205 B2
(45) Date of Patent: May 27, 2008

(54) MAINTENANCE OF XML DOCUMENTS

(75) Inventors: Vladislav Bezrukov, Leimen (DE); Hartwig Seifert, Elchesheim-Illingen (DE); Nikhil Dhairyawan, Eppelheim (DE); Andreas Hirche, Hirschberg (DE)

(73) Assignee: SAP AG, Walldorf (DE)

( * ) Notice: Subject to any disclaimer, the term of this patent is extended or adjusted under 35 U.S.C. 154(b) by 376 days.

(21) Appl. No.: 10/695,375

(22) Filed: Oct. 28, 2003

(65) Prior Publication Data

US 2005/0091581 A1    Apr. 28, 2005

(51) Int. Cl.
*G06F 17/00* (2006.01)

(52) U.S. Cl. .................. 715/234; 715/255; 707/102; 707/103 R

(58) Field of Classification Search ............. 715/513, 715/530, 234, 255; 707/102, 103 R, 103 Y, 707/103 Z, 200
See application file for complete search history.

(56) References Cited

U.S. PATENT DOCUMENTS

| | | | |
|---|---|---|---|
| 2003/0009472 A1* | 1/2003 | Azami et al. ............. | 707/101 |
| 2003/0069881 A1* | 4/2003 | Huttunen .................. | 707/5 |
| 2003/0229852 A1* | 12/2003 | Uramoto et al. .......... | 715/513 |
| 2004/0034830 A1* | 2/2004 | Fuchs et al. ............. | 715/501.1 |
| 2004/0064481 A1* | 4/2004 | Azami ...................... | 707/104.1 |
| 2004/0103105 A1* | 5/2004 | Lindblad et al. .......... | 707/100 |
| 2004/0139091 A1* | 7/2004 | Shin ......................... | 707/100 |
| 2004/0210946 A1* | 10/2004 | Shin ......................... | 715/500.1 |

OTHER PUBLICATIONS

Marc Girardot, Neel Sundaresan, "Efficient Representation And Streaming of XML content Over The Internet Medium", IEEE, 2000, pp. 67-70.*

* cited by examiner

*Primary Examiner*—Doug Hutton
*Assistant Examiner*—Chau Nguyen
(74) *Attorney, Agent, or Firm*—Fountainhead Law Group P.C.

(57) ABSTRACT

A system and a method of maintaining extensible markup language (XML) document includes splitting an XML document into fragments according to rules stored in a configuration file, binding each of the fragments to an object in a content management system, and providing a reference between the XML document and the fragments.

36 Claims, 3 Drawing Sheets

MAINTENANCE OF XML DOCUMENTS

TECHNICAL FIELD

This invention relates to maintenance of XML documents.

BACKGROUND

XML (Extensible Markup Language) is a flexible way to generate common information formats and share both the format and the data on the World Wide Web, intranets, and elsewhere. XML is similar to hypertext markup language (HTML). Both XML and HTML include markup symbols to describe a file or page's contents. HTML describes the content in terms of how the content is displayed while XML describes the content in terms of what data is being described. Thus, an XML file can be processed purely as data by a program. Alternately, the XML file can be displayed or stored.

SUMMARY

In one aspect, the invention features a system and a method of maintaining extensible markup language (XML) document. The method includes having rules in a configuration file, splitting an XML document into fragments according to the rules, binding each of the fragments to an object in a content management system, and providing a reference between the XML document and the fragments.

Embodiments may include one or more of the following. The method can include storing the content associated with a fragment in the content management system. The method can include associating the content with a particular object in the content management system. The method can include replacing the content associated with each fragment with a link to the object in the content management system. The method can include associating multiple fragments with a particular object in the content management system. The method can include detecting an outgoing reference to an object attribute and ensuring the reference is unique.

In another aspect, the system and method can include setting the rules according to an application. The rules can also include sub-rules, encoding rules and/or a fragment rules. Fragment relation rules remove a fragment from the XML document and replace the fragment with a reference. The rules a can also include configuration rules, and the configuration rules can include an unparsed object rule that extracts a string associated with an unparsed object and replaces the string with a reference and/or a hyperlink rule that replaces a link to another object attribute with a reference. The sub-rules can include a pattern rule that extracts textual content from a fragment, a class rule that provides a class name to an object, an attribute rule that assigns each object with an attribute type. The attribute type can include a logical object (LOIO) or a physical object (PHIO). Encoding rules can include internal entity encoding rules, external name encoding rules, unparsed object encoding rules, and/or hyperlink encoding rules.

In another aspect, the fragment can include a sub-fragment. The method can include binding the sub-fragment to an object in a content management system, and providing a reference between the fragment and the sub-fragment.

In another aspect, the invention features a computer program product, tangibly embodied in an information carrier, for executing instructions on a processor, the computer program product being operable to cause a machine to split an XML document into fragments according to rules stored in a configuration file, bind each of the fragments to an object in a content management system, and provide a reference between the XML document and the fragments.

Embodiments may include one or more of the following. The computer program product can be configured to cause the machine to store the content associated with a fragment in the content management system. The computer program product can be configured to cause the machine to associate the content with a particular object in the content management system. The computer program product can be configured to cause the machine to replace the content associated with each fragment with a link to the object in the content management system. The computer program product can be configured to cause the machine to associate multiple fragments with a particular object in the content management system. The computer program product can be configured to bind the sub-fragment to an object in a content management system and provide a reference between the fragment and the sub-fragment.

In another aspect, the invention features a system including a means for splitting an XML document into fragments according to rules stored in a configuration file, a means for binding each of the fragments to an object in a content management system, and a means for providing a reference between the XML document and the fragments.

Embodiments may include one or more of the following. The system can include a means for storing the content associated with a fragment in the content management system. The system can include a means for associating the content with a particular object in the content management system. The system can include a means for replacing the content associated with each fragment with a link to the object in the content management system. The system can include a means for associating multiple fragments with a particular object in the content management system. The system can include a means for binding a sub-fragment to an object in a content management system and a means for providing a reference between the fragment and the sub-fragment.

In another aspect, the invention features a method including the steps of splitting an XML document into fragments according to rules stored in a configuration file, binding each of the fragments to an object in a content management system, and providing a reference between the XML document and the fragments.

Embodiments may include one or more of the following. The method can also include a step of storing the content associated with a fragment in the content management system. The method can also include a step of associating the content with a particular object in the content management system. The method can also include a step of replacing the content associated with each fragment with a link to the object in the content management system. The method can also include a step of associating multiple fragments with a particular object in the content management system. The method can also include a step of binding a sub-fragment to an object in a content management system and a step of providing a reference between the fragment and the sub-fragment.

One or more aspects of the invention may provide one or more of the following advantages.

The content management system splits an XML document into fragments according to rules. This fragmentation allows the reuse of fragments in other XML documents. Reuse of content can reduce generation and/or maintenance cost of the XML document since content does not have to be generated multiple times for each XML document.

The use of reference encoding rules to introduce an object-reference as part of the reference name provide uniqueness in naming. The object-reference part in the name avoids possible name duplications between content management system objects.

Automatic fragmentation according to rules facilitates the fragmentation process eliminating the need for a user to manually split the document into fragments. This reduces the work for fragmentation and makes the fragmentation process consistent between documents.

Fragmentation rules allow tuning of fragments' location without creating unnecessary fragments (comparing to a level-based approach).

Other features, objects, and advantages of the invention will be apparent from the description and drawings, and from the claims.

DETAILED DESCRIPTION

Figure 1:
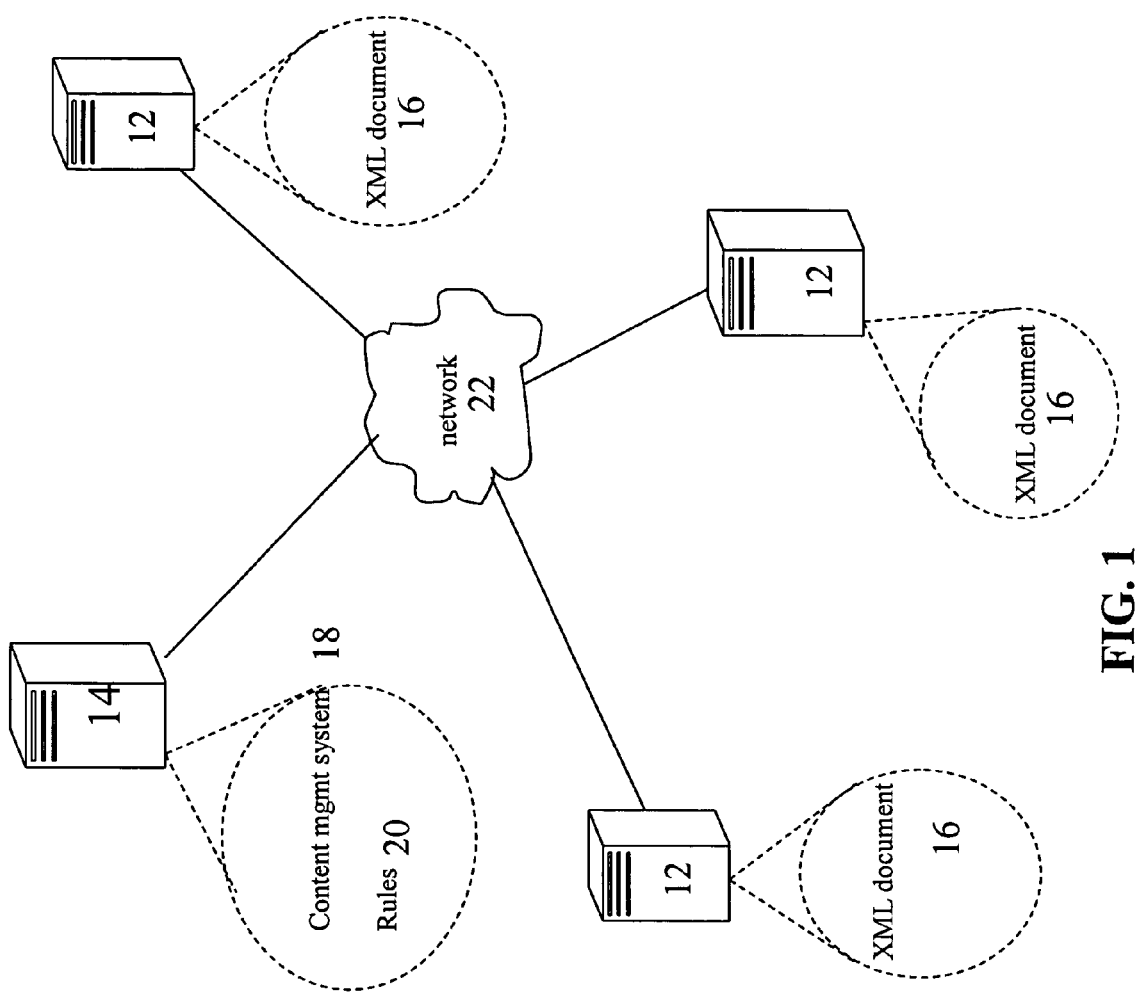
FIG. 1 is a block diagram of a system.

As shown in FIG. 1, a system 10 in accordance with the invention includes a client 12 and a server 14. System 10 is a client-server network. In a client-server network, one server 14 is activated and awaits client requests. Typically, multiple client programs share the services of a common server program. Client 12 includes an extensible markup language (XML) document 16. Server 14 includes a content management system (CMS) 18 and rules 20. Server 14 communicates with client 12 over a network 22.

Figure 2:
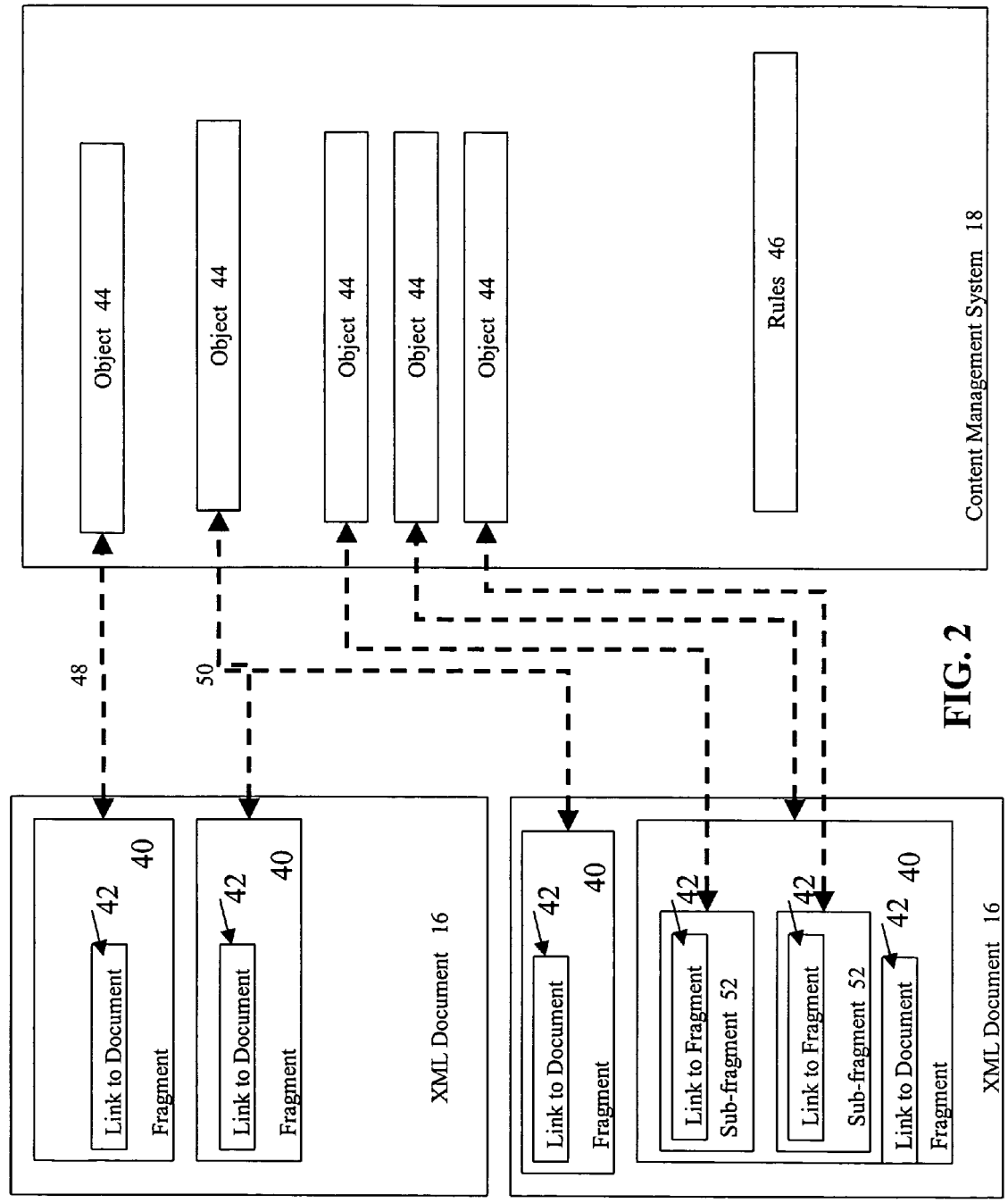
FIG. 2 is a block diagram of an XML document and a content management system.

As shown in FIG. 2, content management system 18 fragments XML document 16 into fragments 40, the fragments 40 having links 42 to the XML document 16. Content management system 18 includes objects 44 and rules 46. Each fragment 40 is associated with an object 44 (as represented by dotted line 48). Content management system 18 splits the XML document 16 into smaller pieces (i.e., fragments 40) according to the rules 46. This fragmentation allows the reuse of fragments 40 in other XML documents 16 (as shown by dotted line 50). Reuse of content among multiple XML documents can reduce generation and/or maintenance cost of the XML document 16. More specifically, a fragment of content originally included in an XML document 16 is stored as an object 44. This object 44 can be used by multiple XML documents 16. Thus, the content does not have to be generated for each XML document 16. Instead, only a proper reference to the fragment 40 and object 44 is included in the XML document. For example, a copyright statement can be re-used in multiple documents. The content management system 18 stores the content as an object 44 in the content management system 18. When the content management system 18 fragments an XML document 16, the content management system 18 establishes a reference (e.g., a link 42) between the XML document 16 and its fragments 40. The content management system 18 uses links 42 to assemble (or reassemble) the XML document 16 from the document's fragments 40. Fragments 40 can include sub-fragments 52 (i.e. fragments of fragments 40). The content management system 18 establishes links between the sub-fragments 52 and the XML document 16.

Figure 3:
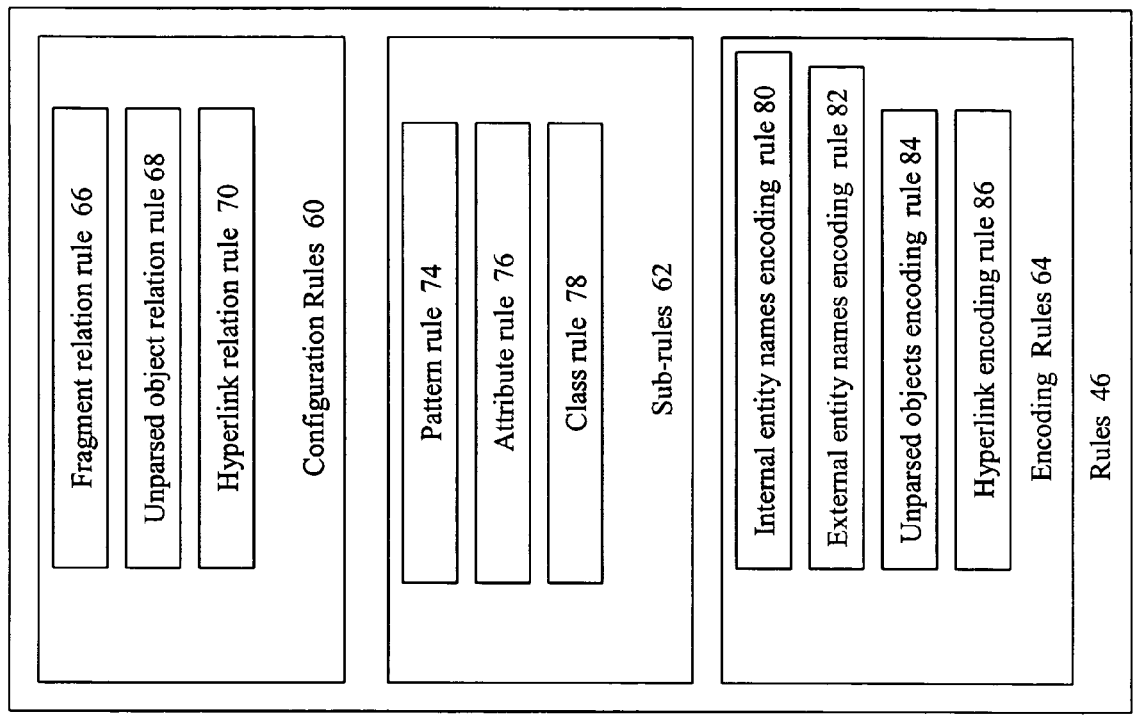
FIG. 3 is a block diagram of rules included in the content management system.

As shown in FIG. 3, to fragment XML documents 16, the content management system 18 includes rules 46. The rules 46 include configuration rules 60, sub-rules 62, and encoding rules 64. Configuration rules 60 include fragment relation rules 66, unparsed object relation rules 68, and hyperlink relation rules 70. Sub-rules 62 include pattern rules 74, attribute rules 76, and class rules 78. Encoding rules 64 include internal entity name encoding rules 80, external entity name encoding rules 82, unparsed object encoding rules 84, and hyperlink encoding rules 86.

The content management system 18 uses configuration rules 60 to analyze the content of an XAL document 16, split the XML document into fragments 40 and sub-fragments 52, and detect relations to the non-XML objects. The configuration rules 60 classify relations between XML document 16, fragments 40, and objects 44. A first type, represented by fragment relation rules 66, is based on a relation between any two XML fragments 40 where the target object 44 is also a part of the XML document 16. A second type, represented by unparsed object relation rules 68, is based on a relation between an XML object 44 and an unparsed object (e.g., image) where the unparsed object is also a part of the XML document 16. A third type, represented by hyperlink relation rules 70, is based on a relation from an XML object 44 that points to another object 44, but the target object is not part of the XML document 16.

The fragment relation rules 66 detect and generate a relation from a XML fragment 40 to another XML fragment since the target XML fragment 40 represents a logical part of the first XML fragment 40. The content management system 18 relies on this relation for assembling (or reassembling) the document by traversing all fragment relations.

The following is an example of the use of the fragment relation rules 66:

```
<Fragment id="lesson">
<Pattern> . . . </Pattern>
<Infoclass> . . . </Infoclass>
<SetAttribute type='PHIO'> . . . </SetAttribute>
</Fragment>.
```

The attribute "id" is used for distinction between fragments 40 generated by fragment relation rules 66. The content management system 18 locates fragments 40 using the fragment relation rules 66 based on the sub-rule "<Pattern>". Content management system 18 treats each fragment 40 as a new object 44 and generates a fragment relation from the fragmented XML document 16 to the new fragment 40. The content of the XML document 16 is changed. Content management system 18 removes the content of fragment 40 from XML document 16 and generates a reference replacing the fragment body. For example, the reference can be expressed in the XML entity 10 syntax (or any other syntax that is supported by the available XML parser or/and the content management system 18 (e.g., W3C XML Include syntax)).

Unparsed object relation rules 68 detect and generate the relation from an XML fragment 40 to a non-XML (e.g., unparsed) object 44, for example, to an image. The target non-XML object semantically belongs to the fragment 40 (e.g., the referenced image is printed out along with the rendered XML fragment 40 when rendering is requested). However, an XML parser cannot parse the target non-XML object. Thus, the operations like validation that deal with XML sources can filter out the non-XML objects.

The following is an example of the use of object relation rules 68:

```
<UnparsedObject id="icon">
<Pattern> . . . </Pattern>
<Infoclass> . . . </Infoclass>
<SetAttribute type='PHIO'> . . . </SetAttribute>
</Fragment>.
```

The content management system 18 uses the attribute "id" to classify unparsed objects according to the unparsed object relation rules 68. The content management system 18 uses unparsed object relation rules 68 to extract a string from the XML fragment 40 that includes an encoded link to the unparsed object. Since the unparsed object relation rule 68 can imply generation of new content management system (CMS) objects (fragments 40), e.g. when importing an XML document into content management system, this rule provides to the content management system 18 all necessary information to be able to generate objects 44.

Hyperlink relation rules 70 are used to detect and generate the relation from the XML fragment 40 to an object 44 when the target object does not semantically belong to the fragment 40 (i.e., the target object will not be printed out along with the rendered XML fragment 40 when rendering is requested). Such a reference is used for HTML rendering or for interactive document representation including hypertext references.

The following is an example of the use of hyperlink relation rules 70:

```
<HyperlinkDefinition id="url">
<Pattern>
<Element> . . . </Element>
<Attribute> . . . </Attribute>
</Pattern>
</HyperlinkDefinition>
```

The content management system 18 uses the hyperlink relation rule 70 to classify hyperlinks. This hyperlink relation rule 70 extracts a string from the XML fragment 40 that includes a hyperlink.

The content management system 18 includes sub-rules 62. A pattern rule 74 locates a reference within the fragment 40. An attribute rule 76 binds CMS content to the CMS object attribute. A class rule 78 is used to classify newly created objects 44.

The content management system 18 uses the pattern rule 74 (included in the sub-rules 62) to locate an existing reference (e.g., fragment, unparsed object, or hyperlink) within the given XML fragment 40. XML pattern rule 74 is split into "<Element>" and optional "<Attribute>" parts. An <Element> part is used for addressing an XML element and an <Attribute> includes the attribute of the located element. Example 1 below shows a pattern rule 74 without attributes. Example 2 shows a pattern rule 74 having attributes.

The following is an example (example 1) of the use of the pattern rule 74:

```
<Pattern>
<Element>//URL</Element>
</Pattern>
```

The following is an example (example 2) of the use of the pattern rule 74:

```
<Pattern>
<Element>/SAPCourse</Element>
<Attribute>PublicationDate</Attribute>
</Pattern>
```

Pattern rule 74 extracts the textual content of the addressed element/attribute.

The content management system 18 uses the attribute rule 76 (included in the sub-rules 62) to bind the XML content located by <Pattern> to the CMS object attribute <ObjAttribute>.

The following is an example of the use of attribute rule 76:

```
<SetAttribute type='PHIO'>
<ObjAttribute>LANGUAGE</ObjAttribute>
<Pattern> . . . </Pattern>
</SetAttribute>
```

The attribute 'type' shows the CMS object type (e.g., logical object "LOIO" or physical object "PHIO"). The attribute rule 76 describes a singular attribute binding. For binding of multiple attributes, multiple attribute rules 76 are defined.

The content management system 18 uses the class rule 78 (included in the sub-rules 62) for assigning the specified LOIO and PHIO classes to the object 44 detected by the rule. For example, if a fragment relation rule 66 detects (by <Pattern>) a new fragment 40, this detected fragment 40 is presented as a new object 44. In order to generate object 44, the LOIO and PHIO class information is used. The class rule 78 provides these class names. Another use of these subrules is to determine which fragment/unparsed object rule corresponds to the object 44 to be processed. The class rule 78 is used, for example, when a fragment 40 gets checked in and the attribute binding rules <SetAttribute> are applied to the fragment 40 in order to transfer the (possibly) updated XML content to the CMS object attributes. In this case, this rule works in an opposite way to the <Pattern> rule (<Pattern> is used to locate fragment 40 within the XML document for the given fragment rule, <Infoclass> is used to locate the fragment rule within the set of configuration rules for the given XML document). Such a use of this subrule might be ambiguous, but still correct (CMS attributes are defined in the classes, so the attribute binding is technically always correct in this case).

The following is an example of the use of the class rule 78:

```
<Infoclass>
<LoIOClass>XML_GEN</LoIOClass>
<PhIOClass>XML_GENSRC</PhIOClass>
</Infoclass>
```

The content management system 18 uses reference encoding rules 64 to make references unique throughout the document (which can include some CMS objects). The reference encoding rules 64 introduce an object-reference as a part of the reference name, thus providing uniqueness. The object-reference part in the name avoids possible name duplications between CMS objects.

The encoding rules 64 can include separate ways to encode internal entity names, external entity names, unparsed objects, and hyperlinks.

An internal entity name can be referenced, for example, by <!ENTITY myInternalEntity.sap-int.12345678901234567890112345.MY_CLASS "value"> where myInternalEntity is user-defined-name, sap-int. is the delimiter indicating the reference is an internal entity name, and 12345678901234567890112345.MY_CLASS includes CMS object information. This encoding of an internal entity name is based on the internal entity name encoding rule 80

An external entity name can be referenced, for example, by <!ENTITY myExternalEntity.sap.1111.MY_CLASS SYSTEM "..."> where myExternalEntity is user-defined-name, .sap. is the delimiter indicating the reference is external entity name, and 1111.MY_CLASS includes CMS object information like object GUID and CMS class, that uniquely identifies the referenced object 44. This encoding of an external entity name is based on the external entity name encoding rule 82.

An unparsed object can be referenced, for example, by <myGraphicFileRef="logojpg.sap.22222.MY_CLASS"> where logojpg is user-defined-name, .sap. is the delimiter indicating the reference is external, and 2222.MY_CLASS includes CMS object information like object GUID and CMS class, that uniquely identifies the referenced object. This encoding of an unparsed object relies on the unparsed object encoding rule 84

A hyperlink can be referenced, for example, by <URL url="mRefDocument.txt.sap.3333.MY_CLASS"> where myRefDocument.txt is user-defined-name, .sap. is the delimiter indicating the reference points to a CMS object, 3333.MY_CLASS includes CMS object information like object GUID and CMS class that uniquely identifies the referenced object. This encoding of a hyperlink relies on the hyperlink encoding rule 86.

Embodiments of the invention can be implemented in digital electronic circuitry, or in computer hardware, firmware, software, or in combinations of them. Embodiments of the invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of embodiments of the invention can be performed by one or more programmable processors executing a computer program to perform functions of the invention by operating on input data and generating output. Method steps can also be performed by, and apparatus of embodiments of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

A number of embodiments of the invention have been described. Nevertheless, it will be understood that various modifications can be made without departing from the spirit and scope of the invention.

What is claimed is:

1. A method of maintaining extensible markup language (XML) documents comprising:
   splitting an XML document into fragments according to rules stored in a configuration file, wherein said rules include a configuration rule, a sub-rule, and an encoding rule, wherein said configuration rule includes a fragment relation rule, an unparsed objection rule, and a hyperlink relation rule, wherein said sub-rule includes a pattern rule, an attribute rule, and a class rule, and wherein said encoding rule includes an internal entity name encoding rule, an external entity name encoding rule, an unparsed object encoding rule, and a hyperlink encoding rule;
   binding each of the fragments to an object in a content management system;
   said content management system generating a respective reference between the XML document and each of the fragments; and
   associating multiple fragments with a particular object in the content management system.

2. The method of claim 1 further comprising
   storing content associated with a fragment in the content management system.

3. The method of claim 2 further comprising
   associating the content with a particular object in the content management system.

4. The method of claim 3 further comprising
   replacing the content associated with each fragment with a link to the object in the content management system.

5. The method of claim 1 further comprising
   detecting an outgoing reference to a object attribute.

6. The method of claim 1, the method further comprising:
   analyzing content of the XML document using the configuration files.

7. The method of claim 1 wherein the fragment rule removes a fragment from the XML document and replaces the fragment with a reference.

8. The method of claim 1 wherein the unparsed object rule extracts a string associated with an unparsed object and replaces the string with a reference.

9. The method of claim 1 wherein the hyperlink rule replaces a link to another object attribute with a reference.

10. The method of claim 1 wherein the pattern rule extracts textual content from a fragment.

11. The method of claim 1 wherein the attribute rule assigns each object with an attribute type.

12. The method of claim 11 wherein the attribute type includes logical object (LOIO) or physical object (PHIO).

13. The method of claim 1 wherein the class rule provides a class name to an object.

14. The method of claim 1 wherein the fragment includes a sub-fragment, the method further comprising binding the sub-fragment to an object in a content management system, and providing a reference between the fragment and the sub-fragment.

15. The method of claim 1 further comprising associating the content associated with a fragment with a particular object in the content management system.

16. The method of claim 1 further comprising replacing the content associated with each fragment with a link to the object in the content management system.

17. The method of claim 1 further comprising:
   binding a sub-fragment to an object in a content management system; and
   providing a reference between the fragment and the sub-fragment.

18. The method of claim 1, wherein the plurality of rules comprise rules classifying relations between XML documents, the fragments, and the objects, wherein the fragment relation rule is based on a relation between any two XML fragments that are both part of the XML document, wherein the unparsed object rule is based on a relation between an XML object and an unparsed object that are both part of the XML document, and wherein the hyperlink relation rule is based on a relation between an XML object that is part of the XML document and an object that is not part of the XML document.

19. A computer program product, tangibly embodied in a machine-readable storage device, the computer program product including instructions that, when executed, cause a processor to perform instructions comprising:
   split an XML document into fragments according to a plurality of rules stored in a configuration file, wherein said rules include a configuration rule, a sub-rule, and an encoding rule, wherein said configuration rule includes fragment relation rule, an unparsed objection rule, and a hyperlink relation rule, wherein said sub-rule includes a pattern rule, an attribute rule, and a class rule, and wherein said encoding rule includes an internal entity name encoding rule, an external entity name encoding rule, an unparsed object encoding rule, and a hyperlink encoding rule;
   bind each of the fragments to an object in a content management system;
   generate, by said content management system, a respective reference between the XML document and each of the fragments; and
   associate multiple fragments with a particular object in the content management system.

20. The computer program product of claim 19 further configured to cause the machine to store the content associated with a fragment in the content management system.

21. The computer program product of claim 19 further configured to cause the machine to associate the content with a particular object in the content management system.

22. The computer program product of claim 19 further configured to cause the machine to replace the content associated with each fragment with a link to the object in the content management system.

23. The computer program product of claim 19 wherein the fragment includes a sub-fragment and the computer program product is further configured to:
   bind the sub-fragment to an object in a content management system; and
   provide a reference between the fragment and the sub-fragment.

24. The computer program product of claim 19, wherein the plurality of rules comprise rules classifying relations between XML documents, the fragments, and the objects, wherein the fragment relation rule is based on a relation between any two XML fragments that are both part of the XML document, wherein the unparsed object rule is based on a relation between an XML object and an unparsed object that are both part of the XML document, and wherein the hyperlink relation rule is based on a relation between an XML object that is part of the XML document and an object that is not part of the XML document.

25. A system tangibly embodied on a computer-readable medium comprising:
   means for splitting an XML document into fragments according to a plurality of rules stored in a configuration file, wherein said rules include a configuration rule, a sub-rule, and an encoding rule, wherein said configuration rule includes fragment relation rule, an unparsed objection rule, and a hyperlink relation rule, wherein said sub-rule includes a pattern rule, an attribute rule, and a class rule, and wherein said encoding rule includes an internal entity name encoding rule, an external entity name encoding rule, an unparsed object encoding rule, and a hyperlink encoding rule;

means for binding each of the fragments to an object in a content management system;

means for generating, in said content management system, a respective reference between the XML document and each of the fragments; and means for associating multiple fragments with a particular object in the content management system.

26. The system of claim 25 further comprising a means for storing the content associated with a fragment in the content management system.

27. The system of claim 25 further comprising a means for associating the content with a particular object in the content management system.

28. The system of claim 25 further comprising a means for replacing the content associated with each fragment with a link to the object in the content management system.

29. The system of claim 25 further comprising:
a means for binding a sub-fragment to an object in a content management system; and
a means for providing a reference between the fragment and the sub-fragment.

30. The system of claim 25, wherein the plurality of rules comprise rules classifying relations between XML documents, the fragments, and the objects, wherein the fragment relation rule is based on a relation between any two XML fragments that are both part of the XML document, wherein the unparsed object rule is based on a relation between an XML object and an unparsed object that are both part of the XML document, and wherein the hyperlink relation rule is based on a relation between an XML object that is part of the XML document and an object that is not part of the XML document.

31. A method comprising:
specifying rules in a content management system, wherein said rules include a configuration rule, a sub-rule, and an encoding rule, wherein said configuration rule includes fragment relation rule, an unparsed objection rule, and a hyperlink relation rule, wherein said sub-rule includes a pattern rule, an attribute rule, and a class rule, and wherein said encoding rule includes an internal entity name encoding rule, an external entity name encoding rule, an unparsed object encoding rule, and a hyperlink encoding rule;

analyzing the content of a plurality of XML documents using the configuration rules;

splitting a plurality of XML documents into fragments of content using the configuration rules;

associating each fragment with a particular object in said content management system; and generating a reference between each XML document and a corresponding fragment, wherein the content management system assembles XML documents using the references, and in accordance therewith, reuses the fragments of content in a plurality of different XML document.

32. The method of claim 31, wherein the content management system locates fragments based on pattern sub-rule.

33. The method of claim 31, wherein the unparsed object rule extracts a string from a fragment that includes an encoded link to an unparsed object.

34. The method of claim 31, wherein the hyperlink relation rule detects and generates a relation between a fragment and an object when a target object does not semantically belong to said fragment.

35. The method of claim 31 wherein the rules make references unique.

36. The method of claim 31, wherein the content management system uses the pattern sub-rule to extract content, wherein the content management system uses the attribute sub-rule for binding extracted content to an object attribute, and wherein the content management system uses the class sub-rule for classifying objects.

* * * * *